Patented Apr. 8, 1930

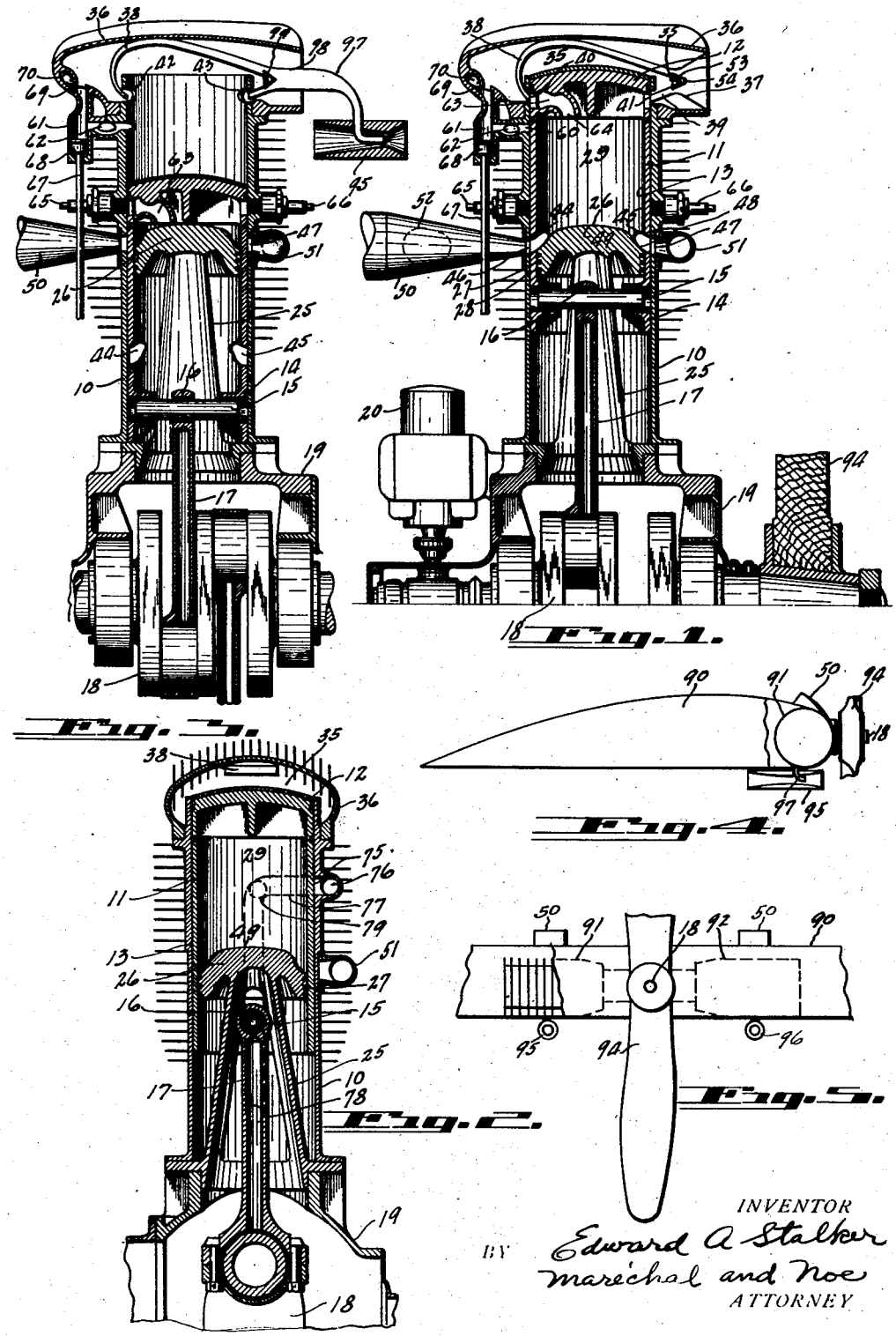

1,753,759

UNITED STATES PATENT OFFICE

EDWARD A. STALKER, OF ANN ARBOR, MICHIGAN

ENGINE

Application filed June 1, 1927. Serial No. 195,795.

This invention relates to internal combustion engines and is particularly adapted to engines of the two-stroke cycle type.

One object of the invention is to provide an engine in which the burnt gases may be effectively scavenged from the combustion chamber.

A further object of the invention is to provide an engine having a piston adapted to reciprocate therein, the combustion chamber being situated between the piston-head and the engine or crank-shaft to which the piston is connected.

A still further object of the invention is to provide a two-stroke cycle engine in which the piston-head forms one side of a compression chamber while a combustion chamber is provided on the opposite side of the piston-head, the piston being provided with a port adapted to establish communication between the compression chamber and the combustion chamber for scavenging the fuel from the combustion chamber.

Another object is to provide a novel method in the operation of the engine.

Further objects and advantages of the invention will be apparent from the following description and the accompanying drawings in which:

Fig. 1 is a central vertical sectional view of a portion of an engine embodying the present invention;

Fig. 2 is a transverse section corresponding to Fig. 1;

Fig. 3 is a central vertical section of a modified form of construction;

Fig. 4 is a side elevation showing the engine mounted in an airplane wing; and

Fig. 5 is a front elevation of the engine mounting corresponding to Fig. 4.

Referring more particularly to the drawings by reference numerals, in which corresponding numerals designate like parts in the various views; one embodiment of the invention is shown in Figs. 1 and 2 as a two-stroke cycle internal combustion engine, having a cylinder 10 in which the piston 11 is adapted to reciprocate. The piston embodies the piston-head 12 and the skirt 13 which is constructed as a sleeve slidingly fitting the interior of the cylinder and which is provided with a suitable number of compression rings. At its lower end the sleeve is provided with piston pin lugs 14 which receive the opposite ends of a piston pin 15. Between the two lugs 14 the piston pin is mounted within a bushing 16 in the upper end of the connecting rod 17, the lower end of which is attached to the crank arm of the engine crank-shaft 18. This shaft is mounted in suitable bearings in the engine case designated generally 19, in any suitable manner. One end of the shaft may be connected by suitable gearing to a magneto or other suitable ignition means 20.

The engine case 19 is rigidly provided with a skeleton frame 25 which extends upwardly from the lower end of the cylinder and portions of which are positioned on opposite sides of the connecting rod 17. The upper end of this skeleton frame 25 forms a fixed partition 26 which is provided within the cylinder and within the piston skirt 13. The partition 26 is provided with a suitable number of compression rings 27 along its cylindrical side wall 28 which neatly fits within the cylindrical inner bore of the piston skirt. A combustion chamber 29 is thus provided between the lower side of the piston-head 12 and the upper side of the partition 26 and within the piston itself. The piston is caused to reciprocate within the cylinder by the explosions of the gases within the combustion chamber and this causes the rotation of the crank-shaft to which the lower part of the piston skirt is connected. It will thus be clear that the partition 26 and the combustion chamber itself is between the piston-head and the crank-shaft which is operably connected to the piston.

On the opposite side of the piston-head from the combustion chamber is a compression chamber 35. When the piston is at the inner end of its stroke this compression chamber is defined by the piston-head, the cylinder walls and the enclosing upper walls 36 at the top of the cylinder. This compression chamber which is supplied with air in a manner which will be later described, provides a space in which the piston may compress air in its outward movement; and a port in the piston at a predetermined time in the stroke of the piston establishes communication between the compression chamber 35 and the combustion chamber 29 so that the burnt gases may be scavenged from the combustion chamber. An air intake opening 37 at one side of the upper walls 36 provides for the admission of air into the compression chamber 35. It will be understood that as the piston moves downwardly in the cylinder towards the crank-shaft air is introduced into the compression chamber by reason of the tendency of the piston to create a suction within the chamber; preferably an additional means to be later described assists in forcing air into the compression space when the piston is traveling downwardly. The opening 37 through which air is taken into the compression chamber divides into two branched passages 38 and 39 the ends of which open adjacent to the piston wall as shown and register with two intake ports 40 and 41 in the piston when the latter is at the end of its out-stroke. These ports communicate at the same time with the compression chamber 35 through the openings 42 and 43 provided in the upper portion of the cylinder and of larger size than the ends of the branched passages 38 and 39.

With the various parts of the engine in the position indicated in Fig. 1 the air which has been compressed in the chamber 35 by the upward movement of the piston flows through the ports 40 and 41 into the combustion chamber 29 and travels downwardly through the combustion chamber so as to scavenge the burnt gases, then flows out through the exhaust ports 44 and 45 shown positioned at opposite sides of the piston skirt and registering at this time with corresponding openings 46 and 47 in the cylinder walls. The top of the partition 26 is provided with downwardly curving side portions 48 which extend away from the raised central portion 49 so that the burnt gases and scavenging air may encounter a minimum of resistance in their motion to and out of the exhaust ports. The exhaust ports 46 and 47 in the cylinder communicate with the exhaust passages 50 and 51, the latter extending around the cylinder and connecting at 52 to the exhaust passage 50. It will thus be apparent that the air which has been compressed by the piston in the compression chamber 35 will flow rapidly through the inlet ports of the piston when communication is thus established; and in doing so will induce a flow of air through branch passages 38 and 39 by a sort of injector effect. The burnt gases will thus be completely scavenged from the combustion chamber by the air compressed in chamber 35 and the air flowing in through the passages 38 and 39. After the pressure of the air in the compression chamber 35 has been materially reduced by the flow of air into the combustion chamber air continues to flow into the compression chamber 35 through the intake opening 37 to continue the scavenging flow until the ports in the piston are moved out of registration with the ports in the cylinder. A pair of automatic valves 53 pivoted at 54 are provided in the intake passage 37 and a suitable spring 55 normally urges these valves apart so as to tend to close the passage 37 against a reverse flow or exhaust of air through this passage. Thus as soon as the piston starts to move out in the compression chamber 35 the spring 55 closes the two flaps 53 against the outer walls of the intake opening 37 so that the air may be compressed by the piston within the compression chamber. When the piston moves in from its outermost position indicated in Fig. 1 the suction which tends to be created by the piston and the pressure created by the external air forcing means, to be later described, automatically opens the passage 37 by forcing the two flaps 53 together against the tension of the spring.

Fuel is introduced into the combustion chamber through the port 40 in the piston at a predetermined point in the stroke of the piston. A fuel intake passage 60 is provided in the cylinder wall some distance below the upper end of the cylinder and a fuel chamber 61 is provided adjacent the passage 60. Suitable fuel such as gasoline or combustible oils, etc., is introduced through a fuel supply nozzle 62 which is directed towards the cylinder. The fuel chamber 61 communicates with the combustion chamber when the piston is in position to cause registration of the inlet opening 40 with this passage 60. When the piston moves outwardly the burnt gases within the combustion chamber are under considerable pressure even up to the time the piston is nearly at the end of its outstroke. When communication is established between the combustion chamber and the fuel chamber 61 through the opening 60 the hot exploded gas within the combustion chamber will pass rapidly into the fuel chamber through the opening 60 and be trapped therein under considerable pressure. Communication will be shut off an instant later as the piston continues to move outwardly and the opening 60 is covered. During the downstroke of the piston communication is again established between the fuel chamber 61, now under pressure, and the combustion chamber 29 which is now only slightly above atmospheric pressure due to the comparatively small amount of compression which obtains in the combustion chamber at this time. The gases within the fuel chamber 61 will therefore rush out through the opening 60 into the combustion chamber and carry along a charge of fuel from the nozzle 62. The mixture of fuel and burnt gases which is supplied through the opening 60 is quite rich in fuel so that the proper fuel mixture will be produced after this rich mixture mixes with the air in the combustion chamber.

The piston-head is provided with a recess or chamber 63 at one end of which is the intake port 40 and the other end of which opens at 64 into the main combustion chamber. Since the fuel is introduced as a very rich mixture of burnt gases and fuel through the port 40 directly into the chamber 63, when the piston is moved substantially to its innermost limit of travel the explosive mixture within the recess or chamber 63 will be at least as rich as the rest of the mixture which has been compressed by the piston. At this time the port 40 will register with the spark plug 65 so that the extra rich mixture within the chamber 63 will be exploded. A second spark plug 66 is provided so that it will register with the port 41 of the piston on the opposite side of the cylinder, where dual ignition is to be used. After the explosion takes place within the combustion chamber of course the piston will be moved outwardly due to the high pressure created on the lower side of the piston and thus cause the operation of the crank-shaft. The piston will compress an explosive charge on each in-stroke and each out-stroke will be a power stroke. On each out-stroke the fuel chamber 61 will be supplied with a charge of hot gases under pressure, the fuel being introduced on the first portion of the power stroke of the piston, and when the piston has reached the end of its power stroke the burnt gases will be scavenged completely from the combustion chamber.

The amount of fuel which is supplied through the nozzle 62 to the combustion chamber may be controlled by controlling the volume of the fuel chamber 61. This may be accomplished in the manner shown by means of a control rod 67 at one end of which is a control piston 68 adapted to be slidingly held within a cylindrical portion of the fuel chamber 61. When the control rod 67 is raised the cubical contents of the chamber 61 is decreased and consequently the amount of fuel which is withdrawn from the nozzle 62 is decreased thus cutting down the power of the engine. For starting conditions the compression chamber 35 above the piston may communicate with the fuel chamber 61 through a valve 69 which prevents the passage of gas from the fuel chamber 61 to the chamber 35 but permits the inflow of compressed gas into the fuel chamber. The valve 69 may be controlled automatically by a suitable spring 70 which normally maintains the valve 69 seated against an opposing lip on the wall of the fuel chamber.

Referring to Fig. 2 it will be seen that the cylinder is provided with a relief port 75 located some little distance above the top of the piston when the piston is at its inner end of its stroke. This relief port 75 communicates with a relief passage 76 which extends around one side of the cylinder as indicated at 77 and then extends downwardly along the side of the cylinder and communicates with the engine crank-case at 78. Within the pipe 77 is a control valve 79 which may be operated to partly or entirely close the passage from the pipe 76 to the point 78. When the valve 79 is open permitting free flow of gas the piston, when first starting to move outwardly, will force air out of the compression chamber 35 through the port 75 in the cylinder, this air being supplied to the crank-case, until the top of the piston completely covers the opening 75, after which the air will be compressed within the compression chamber as previously set forth. The control valve 79 forms a means for controlling the amount of compression which will be created in the compression chamber when the piston is at the outer end of its stroke. When the control valve 79 is opened the work done by the piston in compressing the gas within the chamber 35 may be reduced to aid in starting conditions or for controlling the amount of power developed by the engine.

The construction just described applying to one cylinder of an internal combustion engine may be used in multi-cylinder engines and it has been found to be particularly adaptable to aircraft engines. When so used the engine may be mounted in back of the propeller so that the whirling propeller will create a flow of air into the inlet opening 37 of the engine. Referring to Figs. 4 and 5 the engine is shown enclosed within the leading edge of the wing 90, the engine being shown as of the two cylinder variety having opposed cylinders 91 and 92. The crank-shaft 18 lies between the two cylinders and to it is attached propeller 94 which is rotated by the engine to drive the aircraft forward. The rearwardly flaring generally venturi shaped inlet passage 37 leading into each cylinder of the engine, in accordance with the construction of Fig. 1, may face forwardly so that the air-blast from the propeller is driven into this opening, and thus the supply of air to the compression chamber 35 is maintained. However, if desired, a separate venturi may be disposed in the air-blast as indicated at 95 and 96, a venturi being supplied for each cylinder so as to supply a flow of air to each compression chamber of the engine. These venturis 95 and 96 may be disposed as shown adjacent the wing in any suitable location. Within the restricted portion of each venturi is an air passage 97 which leads into the inlet opening to the compression chamber. As indicated in Fig. 3 this intake passage 97 has its end 98 directly to the branched intake pipes 38 and 39 through which air is supplied to the compression chamber. The flap valves 99 similar to valves 53, are provided in the two branched passages so that air may be compressed by the piston within the compression chamber and the valves may be opened automatically on the down strokes of the engine piston by the pressure created within the pipe 97 through which the air is forced. The exhaust pipe 50 of each cylinder of the two cylinder engine shown in Fig. 5 may be directed rearwardly above the upper surface of the wing so that the exhaust gas in its rearward discharge at high velocity may have a tendency to increase the lift of the wing. Furthermore when the exhaust flow is disposed as shown the propeller creates a rapid flow of air past the outside of the exhaust pipe and thus the exhaust is sucked out by reason of this flow and the scavenging action of the engine is assisted.

While the form of apparatus and the method of operation herein described constitute preferred embodiments of the invention, it is to be understood that the invention is not limited to these precise forms of apparatus and methods of operation, and that changes may be made therein without departing from the scope of the invention which is defined in the appended claims.

What is claimed is:

1. In an engine, a cylinder, a piston operable therein, an engine shaft operated by said piston, fuel-feeding means, a stationary member mounted within said cylinder and piston and between the piston-head and the shaft to cooperate with the piston-head in forming a combustion chamber, said cylinder providing a compression chamber on the opposite side of said piston-head partly defined by the cylinder wall and the piston-head in which air is compressed by the piston during its power stroke, and means for establishing communication between opposite sides of said piston-head for scavenging burnt gases from the combustion chamber.

2. In an engine, a cylinder and piston construction providing a combustion chamber on one side of the piston-head and a compression chamber on the other side thereof in which gas may be compressed by the piston, said piston having a port for placing said combustion chamber in communication with said compression chamber for scavenging burnt gases from the combustion chamber, and means operated by the injector effect of the scavenging flow through said port for introducing a supplementary flow of scavenging air.

3. In an engine, a cylinder, a piston operable therein, a combustion chamber on one side of the piston-head, a compression chamber on the other side of the piston-head in which scavenging air may be compressed by the piston, a port in the piston adapted to place said combustion chamber in communication with said compression chamber when the piston is at one end of its stroke, fuel-feeding means for the supply of fuel to said combustion chamber, said fuel-feeding means being adapted to register with the port in the piston only when the piston has moved some distance from the end of its stroke, and ignition means for said combustion chamber, said ignition means also registering with said port in the piston when the piston is at the other end of its stroke.

4. In an engine, a cylinder, a piston operable therein, an inlet port in the piston through which fuel may be introduced into the combustion chamber, an auxiliary chamber in free communication with the combustion chamber and with said port at all times, and ignition means so positioned as to periodically register with the said port when the piston-head is adjacent the end of the combustion chamber.

5. In an engine, a cylinder, a piston operable therein and having a fuel inlet port in the wall thereof, an inlet chamber of substantial length formed in the piston and communicating at all times with the combustion chamber and said fuel inlet port, fuel-feeding means for feeding fuel into said chamber at a certain point in the stroke of the piston, and ignition means positioned in said cylinder so as to register with said chamber at a certain point in the stroke of the piston.

6. In an engine, a cylinder, a piston operable therein provided with a port in the wall thereof, an inlet chamber formed in the piston and communicating with the combustion chamber and with said port, fuel-feeding means for feeding fuel into said chamber at a certain point in the stroke of the piston, and ignition means positioned in said cylinder so as to register with said port at a certain point in the stroke of the piston, an air-supply means for supplying scavenging air under pressure, said port being adapted to register with said scavenging means when the piston is adjacent the end of its power stroke.

7. In an engine, a cylinder, a piston operating therein, a combustion chamber on one side of the piston-head, a fuel-feeding port in the cylinder through which fuel is introduced into the combustion chamber, means provided in said piston for establishing communication between said fuel-feeding port and said combustion chamber at a certain point of the stroke of the piston on the in and out strokes of the piston so that burnt gases may pass out through the fuel-feeding port under pressure on the expansion stroke of the piston to supply the fuel through said port on the successive stroke of the piston.

8. In an engine, a cylinder, a piston operable therein, a combustion chamber on one side of the piston-head, a port in said piston adapted to register successively with a source of scavenging air, fuel-feeding means and ignition means.

9. In an engine, a cylinder, a piston operable therein, a combustion chamber on one side of the piston-head, a compression chamber on the other side of said piston-head in which gas may be compressed by the piston, means for establishing communication between said combustion chamber and said compression chamber at a certain point in the stroke of the piston, a relief passage communicating with said compression chamber when the piston is adjacent one end of its stroke, and means for controlling the flow of gas through said relief.

10. In a two-cycle internal combustion engine, a stationary cylinder, a piston operable therein, a combustion chamber on one side of said piston, and means independent of said piston for forcing a flow of scavenging air through said combustion chamber at a certain point in the cycle of operation, said means being driven by the engine and having provision for injecting a supplementary flow of scavenging air.

11. In a two-cycle internal combustion engine, a cylinder, a piston operable therein, a combustion chamber on one side of said piston, and means for forcing scavenging air through said combustion chamber, said means being driven by the engine and comprising a chamber of which the piston head forms a part, and blast creating means for supplying air under pressure to said chamber.

12. In combination, a two-stroke internal combustion engine, a propeller driven thereby, stationary means fixed in the propeller blast for creating a flow of scavenging air, means for supplementing the flow of scavenging air, and stationary means fixed in the propeller blast for sucking burnt gases from the engine.

13. In an engine, a cylinder and piston construction providing a combustion chamber on one side of the piston-head, fuel supply means, means for supplying scavenging air to said combustion chamber at a certain point in the cycle of operations to scavenge burnt gases, and means for supplying a supplementary scavenging flow of air to the combustion chamber arranged so that the first mentioned scavenging flow of air to the combustion chamber causes the supplementary scavenging flow of air by induction.

14. In a two-stroke cycle engine, a cylinder and piston construction providing a combustion chamber on one side of the piston and having a port through which air may be supplied to the combustion chamber and an independent fuel inlet passage, means for forcing a scavenging air flow through said port into the combustion chamber, said means having an injector device for introducing a supplementary flow of scavenging air through said port.

In testimony whereof I hereto affix my signature.

EDWARD A. STALKER.